Dec. 18, 1956 E. ALDASORO 2,774,958
SAFETY VALVE AND SIGNAL MEANS FOR HYDRAULIC BRAKES
Filed March 24, 1954 2 Sheets-Sheet 1
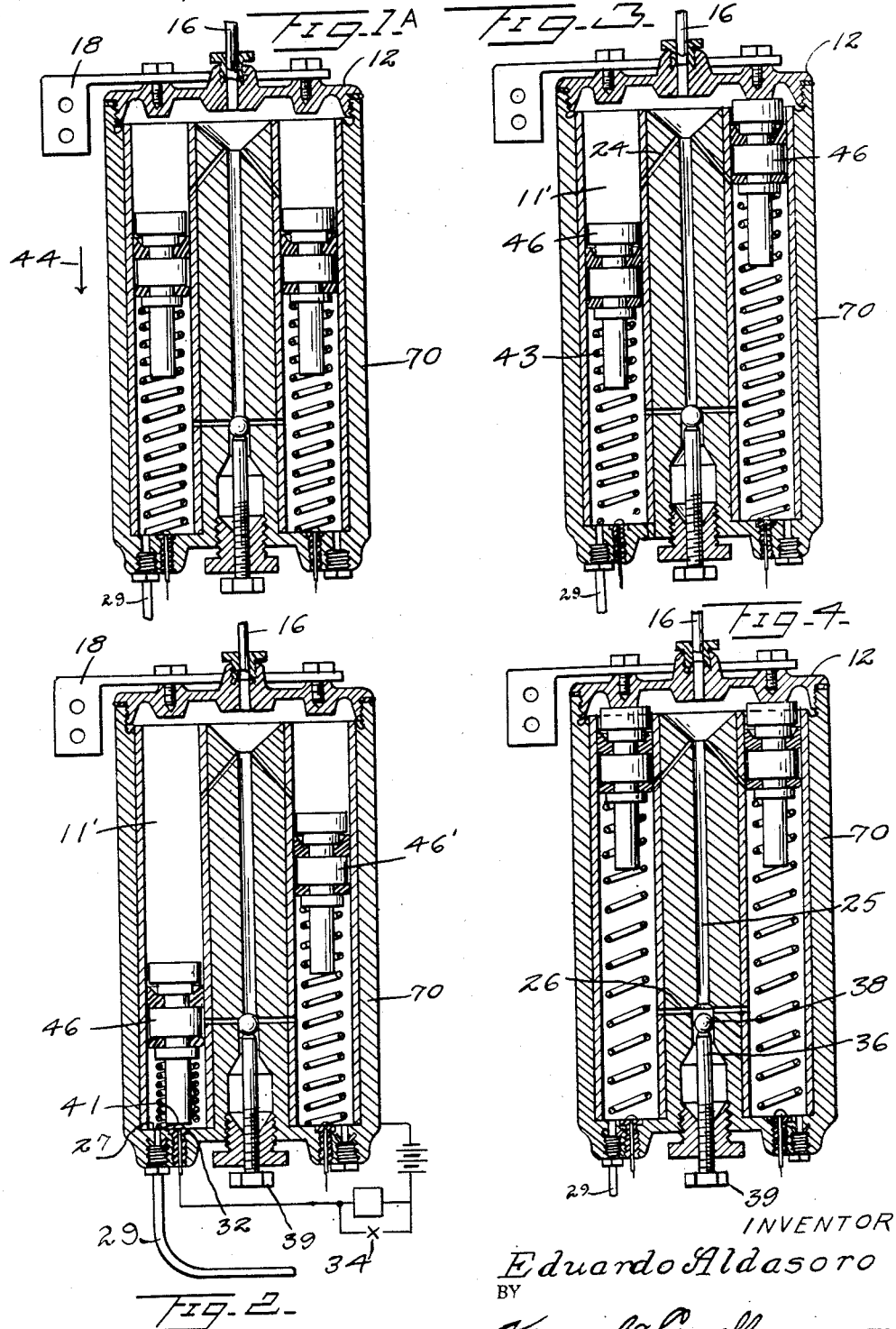
INVENTOR
Eduardo Aldasoro
BY
Kimmel & Crowell ATTORNEYS Dec. 18, 1956     E. ALDASORO     2,774,958
SAFETY VALVE AND SIGNAL MEANS FOR HYDRAULIC BRAKES
Filed March 24, 1954     2 Sheets-Sheet 2
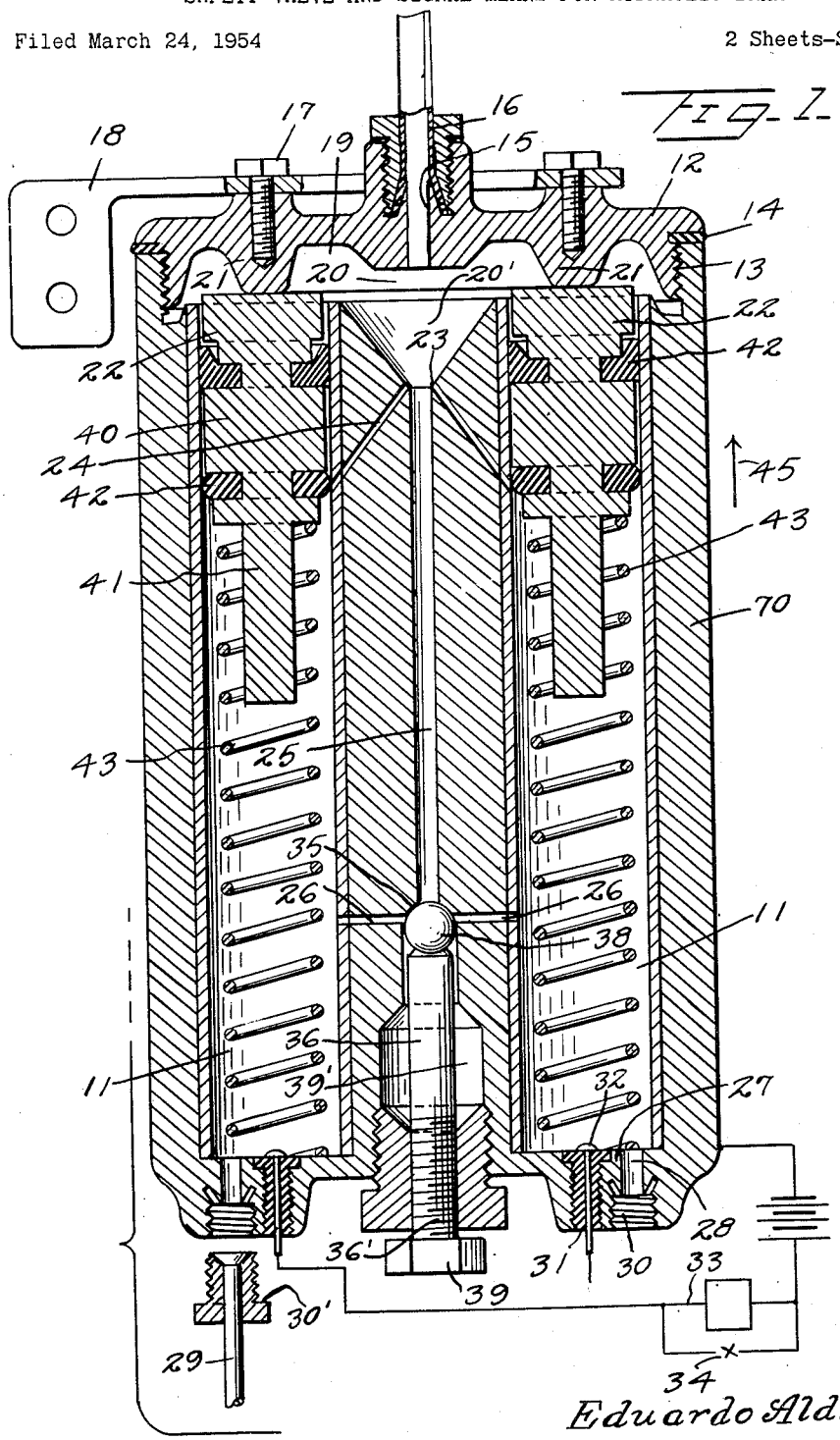
INVENTOR
Eduardo Aldasoro.
BY Kimmel & Crowell
ATTORNEYS

United States Patent Office 2,774,958
Patented Dec. 18, 1956

2,774,958

SAFETY VALVE AND SIGNAL MEANS FOR HYDRAULIC BRAKES

Eduardo Aldasoro, Mexico City, Mexico, assignor of one-half to Jose Alvarez Cuervo, Mexico City, Mexico Application March 24, 1954, Serial No. 418,378

3 Claims. (Cl. 340—242)

This invention relates to certain new and useful improvements in safety devices for hydraulic systems, such as hydraulic brakes, which provide efficient means to impede the loss of pressure and fluid in the system, when there is a rupture or leak in any of the feeding lines to various units in the system.

At present, hydraulic systems operate in a multiple closed circuit, that is, providing the interconnection of hydraulic pressure means and feeding lines to the different units in the system, so that the rupture or leak in one of the lines results in loss of pressure or fluid, and total failure of the system. In vehicles using hydraulic brakes, it is well known that feeding pipes, connections and even the rubber pistons in the wheel assemblies become damaged, which results in loss of liquid disabling the entire system with serious consequences, as due to the operating pressures, the damage takes place suddenly and under conditions requiring the operation of the brakes.

There are some safety devices, which impede the loss of fluid when there is a rupture of any of the lines, but these known devices are complicated and incomplete, not providing pressure balancing means for the return of the liquid expanded by the high temperature of operation.

Also, there are known devices acting as safety valves, but these valves do not include alarm means to indicate that one of the lines to the units has ceased operating, indicating the need to repair the system immediately.

Thus, an object of the invention is to provide improvements in the design and construction of safety valves so that they will allow the return of the liquid to the master cylinder, as a result of the expansion of the fluid due to the temperature rise during operation.

Another object of the invention is to provide improvements in safety devices for hydraulic systems, which provide means for automatic cancellation of the return of the liquid, in case of rupture of any of the lines in the system.

Another object of the invention is to provide an improved safety valve for hydraulic systems, which allows the bleeding of the system or elimination of air, as well as the balancing of pressure to insure the proper return of the pistons to their neutral or rest position.

A further object of the invention is to provide a visual or audible alarm means, which operate whenever there is a rupture or leak in any of the feeding lines.

A further object of the invention is to provide improvements in safety valves for hydraulic systems which allow the conventional operation of the hydraulic system, until there is a rupture or leak in any of the feeding lines, which is then closed, permitting the remaining lines to operate normally.

A further object of the invention is to provide a safety valve for hydraulic systems of simplified design and construction, notably reducing its manufacturing costs.

Still a further object of the invention is to provide in safety hydraulic devices, improvements which comprise hermetically sealed pistons, to eliminate losses of pressure and fluid in the system.

With these and other objects in view, the invention consists of improvements in the design, construction and combination of the elements embodying a safety valve for hydraulic systems, as described and illustrated in the accompanying drawings, being understood that changes and variations may be resorted to which fall within the scope of the invention as claimed.

In the drawings:

Figure 1 is a longitudinal section of the safety valve constructed according to the invention, showing its components in their normal neutral position, and including a diagram of the electric circuit for the alarm means.

Figure 1-a is a longitudinal section in smaller scale than Figure 1, illustrating the position of the pistons for the conventional normal operation of the hydraulic system.

Figure 2 is the same longitudinal section as Figure 1, illustrating another step in the operation of the device, showing the relative position of one of the pistons, when the corresponding feeding line has been ruptured.

Figure 3 is the same longitudinal section as Figure 1, illustrating the position of the pistons when one line is ruptured when the pressure of the master cylinder has ceased.

Figure 4 is the same longitudinal sectional view as Figure 1, illustrating the position of the lower center valve during air "bleeding" or balancing the system, allowing the passage of the liquid directly from the master cylinder to the feeding lines, bypassing the safety pistons, to allow the equalization of pressure in all the lines of the system, as well as the return of the pistons to their normal neutral position.

In the form of the invention illustrated in the drawings, there is a general supporting structure 10, which provides cylindrical longitudinal spaces 11, in a number equal to the individual feeding lines to the different units in the system, conventionally operated by a single master cylinder or pump.

In its upper portion, structure 10 has a cover 12 secured thereto by threaded means 13 or any other adequate means, and comprising when the case demands a hermetic gasket 14. The top cover 12 has an inlet 15, to which the main line 16 coming from a master cylinder is attached.

This top cover 12 also has fastening means 17 securing the cover 12 to a plate 18, which can be used to properly secure the device to the chassis or general structure of the hydraulic system or vehicle in which the device is used.

The cover 12 has a concave portion 19 making up an inner chamber 20 for the passage of liquid. The cover 12 has projecting inner stops 21, which are provided for limiting the upper displacement of the pistons 40, which operate in cylinders 11.

The structure 10 at its upper end portion has in communication with the chamber 20a a chamber 20', with a bottom 23, in communication with the upper middle portion of cylinders 11, through slanting conduits 24, and with a central longitudinal bore 25 and lateral transverse conduits 26, for communication of the lower middle portion of cylinders 11 with each other and with said inner chamber 20'.

In its lower portion, structure 10 has at the bottom 27 of each cylinder 11, outlets 28 for each of the feeding lines of the system, one of them illustrated in the different figures, and designated with number 29, the outlet 28 having threaded means 30 for receiving fittings 30' for attachment of conduits 29.

Bottom 27 of cylinders 11 has an insulating means 31 extending therethrough and holding electrode or terminal 32, which is electrically connected by circuit 33 to a visual or audible alarm means 34, which being conventional in design is merely schematically illustrated in Figure 1. The alarm means 34 which as stated may be audible or visual, preferably may be wired to operate independently, for each one of the individual feeding lines of the system, corresponding to each one of cylinders 11, or one alarm 34 may be connected to all terminals 32.

In the lower portion of structure 10, a valve 38 is positioned. The valve 38 operates against a seat 35, the central portion of the structure 10, in the confluence of conduits 25 and 26, which are closed or opened by a valve sphere 38, displaced to its closing position by a valve stem 36 which has in its front end a concave indentation corresponding to sphere 38. This stem 36 is provided with a rear threaded end 36', and it is moved in or out of structure 10, by a cap 39.

A gasket (not shown) can be placed in space 39' of the lower central portion of the structure 10.

Pistons 40, operate in cylinders 11 and are provided at their lower end with a projecting portion 41. The pistons 40 are each provided with grooves to accommodate ring stoppers or seals 42, which act as hydraulic pressure is applied, to seal and prevent any passage of liquid around the pistons 40 so as to establish a complete independence of the lower and upper sections of cylinders 11.

In the cylinders 11, there are helical springs 43, one end against the lower end of piston 40 and the opposite against bottom 27, in order to constantly displace pistons 40 towards the upper portion of structure 10, limited by stops 21 in cover 12.

With these components in their relative position illustrated in the drawings, the device operates with inlet 15 connected by line 16 to a master cylinder or pump (not shown), so that pressure generated in the master cylinder reaches inner chamber 20—20', to act on the upper portion 22 of pistons 40. As cylinders 11 are completely filled with fluid, the displacement of pistons 40 causes a pressure in the feeding lines 29, and all units of the system, equal to that generated in the master cylinders.

Figure 1-a, illustrates the relative position of pistons 40 under normal conditions, when there is pressure in the master cylinder, pistons 40 being displaced in the direction of arrow 44, to eject liquid from cylinders 11 at the same pressure to the different units in the system.

In the case of use of the device in hydraulic brake systems for vehicles, there is present a return pressure, which operates as pressure in master cylinder ceases. The return of the fluid from the units of the system, moves pistons 40 in the direction of arrow 45 in Figure 1, to the limit of their displacement by stops 21. This cycle of operation is repeated as long as the feeding lines 29 do not suffer a rupture or leak, in which case, illustrated in Figure 2, lack of opposing pressure in the lower section of the corresponding cylinder 11, as pressure is built up by the master cylinder, causes piston 46 (same as piston 40) to move all the way down to bottom 27 of cylinder 11' (same as cylinder 11), preventing the loss of fluid, by means of the hermetic ring stoppers or seals 42. When this piston 46, reaches the end of its downward displacement, projecting portion 41 touches electrode or terminal 32, closing the corresponding electric circuit 33 for the operation of alarm means 34, which signals the damage to the corresponding feeding line. Figure 2 clearly illustrates the relative position of piston 46' (also the same as piston 40) in the corresponding cylinder 11, in its normal position as there is opposing pressure in the undamaged feeding line 29.

It should be noticed that the device continues to operate the hydraulic system indefinitely, with the remaining lines and units, so that as illustrated in Figure 3, when pressure in master cylinder ceases, opposing or return pressure takes piston 46' to its upper neutral position, and piston 46 is displaced by helical spring 43 alone, as there is no return hydraulic pressure, to a middle position in cylinder 11', as there will always be in line 16 from master cylinder, a remaining pressure which equalizes that of helical spring 43.

The device includes return means for the fluid from the units to the master cylinder, upon expansion due to temperature raise during operation. The means comprises small diameter conduits 24, connecting chamber 20' with cylinders 11 immediately ahead of the lower piston ring or seal 42 of the piston 40 when in its uppermost neutral position, so that when the pistons 40 are against stops 21, conduits 24 are free to connect the feeding lines 29 with line to master cylinder, allowing the return of the liquid during expansion.

When the master cylinder or pump is operated there is pressure in chamber 20, and the device operates normally displacing pistons 40, due to the difference in diameters with conduits 24.

In the case of rupture of any of the feeding lines 29, as illustrated in Figure 3, the position of piston 46, midway of cylinder 11', below conduits 24 in the cylinder 11' will not allow any leak of fluid in the damaged line 29.

Air bleeding of the lines of the hydraulic system is easily accomplished with this device by turning valve stem 36 which causes sphere 38 to open allowing the fluid to pass through conduits 26 and 25 to the master cylinder and units in the system.

The position of this bleeding valve 38 is clearly illustrated in Figure 4. The bleeding valve 38, when closed, once the air has been bled from the system, returns the device to normal operation, with the pressure equalized in the feeding lines 29 and master cylinder line 16, springs 43 cause pistons 40 to return to their uppermost displacement against stops 21, ready for normal operation.

Having thus described the preferred embodiments of the invention, it should be understood that numerous other modifications and structural adaptations may be resorted to without departing from the scope of the appended claims.

What is claimed is:

1. A safety valve for hydraulic systems comprising a housing having at least one pair of spaced apart cylinders therein, said housing having a pressure chamber at one end thereof communicating with each of said cylinders, an imperforate free piston mounted for reciprocation in each of said cylinders, said housing having a by-pass port extending from said pressure chamber to said cylinder beyond the piston when said piston is at the pressure chamber end of said cylinder, said housing having a second by-pass port extending from said pressure chamber to each of said cylinders at the end opposite said pressure chamber, a manually controlled valve normally closing said second by-pass port, a spring biasing said piston toward said pressure chamber, a conduit connecting said pressure chamber to a source of fluid under pressure, and a conduit connecting each of said cylinders at the end opposite said pressure chamber to a pressure responsive device.

2. A safety valve for hydraulic systems comprising a housing having at least one pair of spaced apart cylinders therein, said housing having a pressure chamber at one end thereof communicating with each of said cylinders, an imperforate free piston mounted for reciprocation in each of said cylinders, said housing having a by-pass port extending from said pressure chamber to said cylinder beyond the piston when said piston is at the pressure chamber end of said cylinder, said housing having a second by-pass port extending from said pressure chamber to each of said cylinders at the end opposite said pressure chamber, a manually controlled valve normally closing said second by-pass port, a spring biasing said piston toward said pressure chamber, a conduit connecting said pressure chamber to a source of fluid under pressure, a conduit connecting each of said cylinders at the end opposite said pressure chamber to a pressure responsive device, and an electric contact mounted in the end wall of said cylinder electrically contacting said piston when said piston is in the lower end of said cylinder.

3. A safety valve for hydraulic systems comprising a housing having at least one pair of spaced apart cylinders therein, said housing having a pressure chamber at one end thereof communicating with each of said cylinders, an imperforate free piston mounted for reciprocation in each of said cylinders, said housing having a bypass port extending from said pressure chamber to said cylinder beyond the piston when said piston is at the pressure chamber end of said cylinder, said housing having a second by-pass port extending from said pressure chamber to each of said cylinders at the end opposite said pressure chamber, a manually controlled valve normally closing said second by-pass port, a spring biasing said piston toward said pressure chamber, a conduit connecting said pressure chamber to a source of fluid under pressure, a conduit connecting each of said cylinders at the end opposite said pressure chamber to a pressure responsive device, an electric contact mounted in the end wall of said cylinder electrically contacting said piston when said piston is in the lower end of said cylinder, an alarm, and an alarm circuit connected to said electric contact whereby said piston will actuate said alarm upon reaching the bottom of said cylinder.

References Cited in the file of this patent

UNITED STATES PATENTS

| 2,046,316 | Bentz | July 7, 1936 |
| 2,239,348 | Wirtanen et al. | Apr. 22, 1941 |
| 2,650,863 | Fore | Sept. 1, 1953 |
| 2,694,191 | Flanga et al. | Nov. 9, 1954 |